(12) United States Patent
Zhang et al.

(10) Patent No.: US 10,654,947 B2
(45) Date of Patent: May 19, 2020

(54) CYCLIC ORGANOSILICON COMPOUNDS AS ELECTRON DONORS IN ZEIGLER-NATTA CATALYST SYSTEMS FOR PRODUCING PROPYLENE POLYMER HAVING HIGH MELT-FLOWABILITY

(75) Inventors: Lei Zhang, Port Lavaca, TX (US); Yiqun Fang, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

(21) Appl. No.: 13/284,602

(22) Filed: Oct. 28, 2011

(65) Prior Publication Data

US 2013/0109820 A1  May 2, 2013

(51) Int. Cl.
| C08F 10/02 | (2006.01) |
| C08F 4/44 | (2006.01) |
| C08F 10/00 | (2006.01) |
| C08F 4/58 | (2006.01) |

(52) U.S. Cl.
CPC ............... C08F 10/00 (2013.01); *C08F 4/58* (2013.01)

(58) Field of Classification Search
CPC ............... B01J 31/0201; B01J 31/0235; B01J 31/0274; C08F 210/06
USPC .......................... 502/116, 158, 232; 526/351
See application file for complete search history.

(56) References Cited

U.S. PATENT DOCUMENTS

| 4,342,856 A * | 8/1982 | Patnaik ................... C08F 10/06 502/127 |
| 4,472,524 A | 9/1984 | Albizzati |
| 4,473,660 A | 9/1984 | Albizzati et al. |
| 4,560,671 A | 12/1985 | Gross et al. |
| 4,581,342 A | 4/1986 | Johnson et al. |
| 4,657,882 A | 4/1987 | Karayannis et al. |
| 5,106,807 A | 4/1992 | Morini et al. |
| 5,407,883 A | 4/1995 | Fushimi et al. |
| 5,684,173 A | 11/1997 | Hosaka et al. |
| 6,228,961 B1 * | 5/2001 | Grison .................. C07F 7/1876 526/194 |
| 6,362,124 B1 | 3/2002 | Kuribayashi et al. |
| 6,552,136 B1 | 4/2003 | Ota et al. |
| 6,657,025 B2 * | 12/2003 | Blackmon ............... C08F 10/00 502/103 |
| 6,689,849 B1 | 2/2004 | Sadashima et al. |
| 6,887,817 B2 | 5/2005 | Lu et al. |
| 6,956,003 B2 | 10/2005 | Kong et al. |
| 6,992,034 B2 | 1/2006 | Xu et al. |
| 7,009,013 B2 | 3/2006 | Evain et al. |
| 7,211,534 B2 | 5/2007 | Lu et al. |
| 7,244,794 B2 | 7/2007 | Park et al. |
| 7,307,036 B2 | 12/2007 | Xu et al. |
| 7,399,812 B2 | 7/2008 | Xie et al. |
| 7,582,712 B1 | 9/2009 | Xu et al. |
| 7,618,913 B2 | 11/2009 | Xu et al. |
| 7,619,049 B1 * | 11/2009 | Fang et al. .................. 526/125.3 |
| 7,651,969 B2 | 1/2010 | Kong et al. |
| 7,718,713 B2 | 5/2010 | Shih et al. |
| 7,790,819 B1 * | 9/2010 | Fang ........................ C07F 7/025 526/128 |
| 8,642,798 B2 * | 2/2014 | Leighton ............... C07F 7/1804 556/408 |
| 2004/0116629 A1 * | 6/2004 | Blackmon et al. ........ 526/124.3 |
| 2005/0202958 A1 | 9/2005 | Yoshikiyo et al. |

FOREIGN PATENT DOCUMENTS

| JP | 57-63311 | 4/1982 |
| JP | A8-143620 | 6/1996 |
| JP | 2002-265477 A * | 9/2002 | ............... C07F 7/18 |

OTHER PUBLICATIONS

Zhang et al. Control of Molecular Weight Distribution for Polypropylene Obtained by a Commercial Ziegler-Natta Catalyst: Effect of a Cocatalyst and Hydrogen. Journal of Applied Polymer Science 120(1). Oct. 2010. pp. 101-108.*

* cited by examiner

*Primary Examiner* — Rip A Lee
(74) *Attorney, Agent, or Firm* — Jones Walker LLP

(57) ABSTRACT

Cyclic organosilicon compounds having a structure represented by the general formula

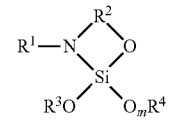

and a method for using thereof as a component of catalysts for producing propylene polymer having a very high melt-flowability are disclosed. The cyclic organosilicon compounds are employed as external electron donors in Ziegler-Natta catalyst systems to dramatically improve the hydrogen response, and therefore the catalyst systems can be used to prepare polymer having high melt-flowability and high isotacticity at high yield.

5 Claims, 1 Drawing Sheet

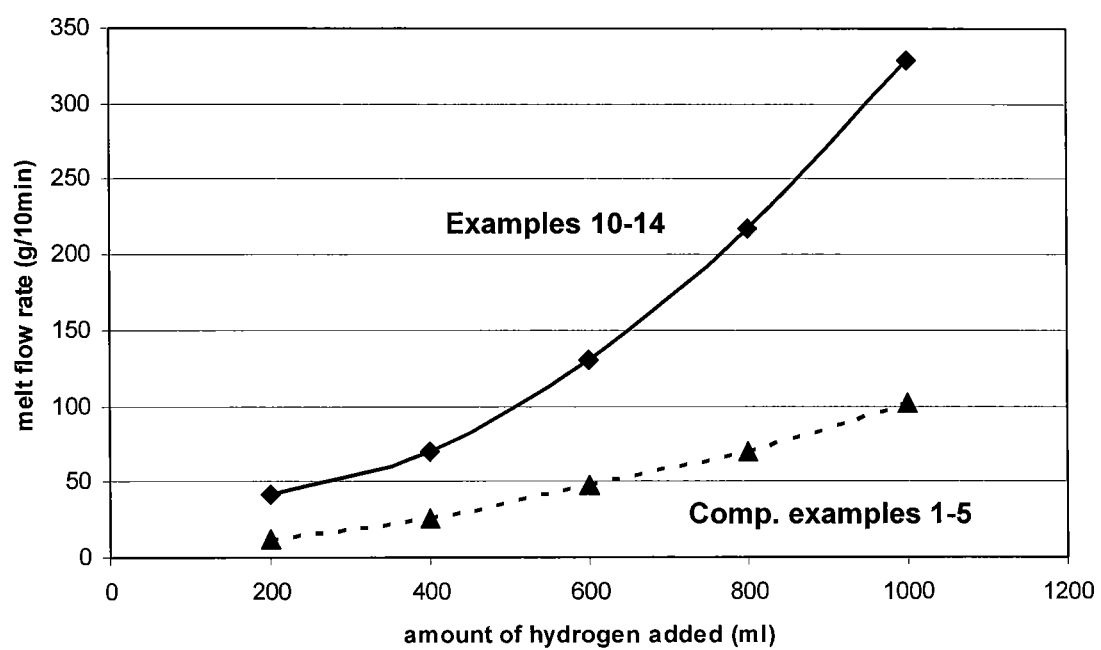

CYCLIC ORGANOSILICON COMPOUNDS AS ELECTRON DONORS IN ZEIGLER-NATTA CATALYST SYSTEMS FOR PRODUCING PROPYLENE POLYMER HAVING HIGH MELT-FLOWABILITY

BACKGROUND

1. Field of the Invention

The present invention relates to novel cyclic organosilicon compounds and a method for using thereof as a component of catalysts for olefins polymerization. In olefins polymerization or copolymerization, in particular, in propylene polymerization or copolymerization, Ziegler-Natta catalyst systems comprising the cyclic organosilicon compounds as the external electron donor component exhibit dramatically-improved hydrogen response, and therefore can be used to prepare polymer having high melt-flowability and high isotacticity at high yield.

2. Description of the Related Art

Ziegler-Natta catalysts for olefins polymerization or copolymerization are well known in the art. These catalyst systems are typically composed of a transition metal-containing active component, generally comprising magnesium, titanium and halogen as main ingredients; and a co-catalyst component, usually an organo-aluminum compound. In the utilization of Ziegler-Natta catalysts for polymerization of alpha-olefins in which isotacticity is a possibility, electron-donating compounds are widely used (1) as an internal electron donor in the solid Ziegler-Natta catalyst component and/or (2) as an external electron donor to be used in conjunction with the solid Ziegler-Natta catalyst component and the co-catalyst component.

It is known in the art that external electron donors act as stereoselective control agents to improve isotacticity, i.e., stereoregularity of the resulted polymer products, by selectively poisoning or converting the active sites of non-stereoregularity present on the surface of a solid catalyst. Also, the catalyst activity, polymerization kinetics, molecular weight, molecular weight distribution, and melt flowability of the resulting polymer depend on the choice of external electron donors. Therefore, in order to improve the olefin polymerization process and the polymer properties, there is always a desire to develop new external electron donors with better combined features.

In propylene polymerization or copolymerization, organo-silicon compounds are commonly used as external electron donors in the Ziegler-Natta catalyst system. Typically, such external electron donors have silicon as the central atom containing at least one Si—OR, Si—OCOR, or Si—NR$_2$ bonds, where R is commonly an alkyl, alkenyl, or aryl group with 1-20 carbon atoms. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,399,812; 7,619,049; and 7,790,819.

Currently the global market has an increasing demand in polypropylene having high melt flowability (high MFR grade polypropylene) to reduce cycle time and to achieve down-gauging while maintaining acceptable impact strength and stiffness. High MFR grade polypropylene is commonly achieved by adding peroxide to the polymer, but such obtained polypropylene usually has odor issues and reduced physical properties. So, production of reactor-grade high MFR polypropylene becomes necessary to avoid these issues.

However, when using the main catalyst components and the external electron donors disclosed in the prior art, polypropylene with a melt flow rate of 50 g/10 minutes or more is impractical due to the insufficient reactivity of molecular weight controlling agents, such as hydrogen. Owning to the designed pressure limit of polymerization reactors, the possible amount of hydrogen feed is practically limited, thus it is impossible to increase the hydrogen pressure to the extent that allows the production of polypropylene having a high melt flow rate, based on prior art methods.

To overcome this production limit, novel external electron donors have been developed in the art to improve the hydrogen response of the catalyst system. Japanese patent publication No. Showa 57-63311 discloses a Ziegler-Natta catalyst system using phenyltriethoxysilane as the external electron donor which, however, has a toxicity issue due to phenyl groups released from the silane donor after polymerization. JP-A8-143620 proposes a method for propylene polymerization using a dialkoxysilane having two aliphatic amino substitutions as the external electron donor, but polymerization activity and polymer stereoregularity are not satisfactory when producing high MFR grade polypropylene. U.S. Patent Publication No. 2005/5202958 A1 discloses aminotrialkoxysilanes (e.g. U donor) as external electron donors in the Zieglar-Natta catalyst system for propylene polymerization, but the molecular weight distribution is narrow on production of polymers with high MFR. U.S. Pat. No. 7,244,794 teaches a method for producing propylene polymer having a high melt-flowability by using a mixed external donor system, in which a secondary electron donor, dicyclopentyldimethoxysilane (DCPDMS) has to be added to the primary alkyltrialkoxysilane donor to boost up the catalyst activity. It also fails to describe any molecular weight distribution.

SUMMARY OF INVENTION

The present invention relates to novel cyclic organosilicon compounds and a method for using thereof as a component of catalysts for olefins polymerization. In olefins polymerization or copolymerization, in particular, in propylene polymerization or copolymerization, Ziegler-Natta catalyst systems comprising the cyclic organosilicon compounds as the external electron donor component exhibit dramatically-improved hydrogen response, and therefore can be used to prepare polymer having high melt-flowability and high isotacticity at high yield.

In accordance with various aspects thereof, the present invention relates to a catalyst system for the polymerization of co-polymerization of alpha-olefin comprising a solid Ziegler-Natta type catalyst component, a co-catalyst component, and an electron donor component comprising at least one cyclic organosilicon compound represented by the formula:

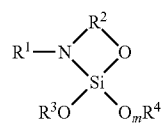

wherein R$^1$ is a hydrocarbon group with 1-20 carbon atoms; wherein R$^2$ is a bridging group with a backbone chain of 1-9 atoms, wherein the backbone of said bridging group is selected from the group consisting of aliphatic, alicyclic, and aromatic radicals; wherein $R^3$ is a hydrocarbon group with 1-6 carbon atoms; wherein m is 0 or 1; and wherein $R^4$ is an aliphatic, alicyclic, or aromatic group. The present invention also relates to a composition containing a compound of the cyclic organosilicon compounds of the aforementioned formula. In accordance with various aspects thereof, the present invention also relates to a method of polymerizing an alpha-olefin comprising polymerizing the alpha-olefin in the presence of the cyclic organosilicon compound of the aforementioned formula.

The features and advantages of the present invention will be readily apparent to those skilled in the art. While numerous changes may be made by those skilled in the art, such changes are within the spirit of the invention.

BRIEF DESCRIPTION OF DRAWINGS

FIG. 1 is a plot showing the relationship between the amount of hydrogen used and the melt flow rate, in order to compare the hydrogen reactivity according to the species of the external donors, based on the results from examples 10-14 and comparative examples 1-5 in the present invention.

DESCRIPTION OF PREFERRED EMBODIMENTS

The present invention relates to novel cyclic organosilicon compounds, a method for the preparation thereof and use thereof as a component of catalysts for olefins polymerization. In olefins polymerization or copolymerization, in particular, in propylene polymerization or copolymerization, it has been discovered that Ziegler-Natta catalyst systems comprising the cyclic organosilicon compounds of the present invention as the external electron donor component exhibit dramatically-improved hydrogen response, and therefore can be used to prepare polymer having high melt-flowability and high isotacticity at high yield.

In accordance with various embodiments of the present invention, a series of organosilicon compounds, which are useful as electron donors in polymerization catalyst systems for the production of polyolefins, particularly polypropylene, are disclosed. The organosilicon compounds of the present invention may be used alone as single constituent in an electron donor component of the catalyst system or may be used in combination with one or more other compounds as an electron donor component of the catalyst system. If more than one compound is used as the electron donor component, one or more of the constituents may be organosilicon compounds of the present invention.

The organosilicon compounds of the present invention that may be used as electron donors in polymerization catalyst systems have a structure represented by the General Formula:

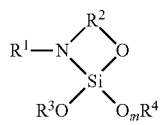

wherein $R^1$ is a hydrocarbon group with 1-20 carbon atoms.
$R^2$ is a bridging group with a backbone chain of 1-9 atoms. "Backbone chain" in this context refers to the atoms that are in the direct linkage between N and O atoms. For example, if —$CH_2$—$CH_2$— is the bridging group, the backbone chain has two atoms, referring to the carbon atoms that provide the direct linkage between N and O atoms. Similarly, if the bridging group has the iso-structure, —CH($CH_3$)—$CH_2$—, the associated backbone chain also has two atoms.

The backbone of the bridging group is selected from the group consisting of aliphatic, alicyclic, and aromatic radicals. Preferably, the backbone of the bridging group is selected from the group consisting of aliphatic radicals, with or without unsaturation. The bridging group may have one or more $C_1$-$C_{20}$ substituents (or side chains) extending off the backbone chain. The substituents may be branched or linear and may be saturated or unsaturated. Similarly, the substituents may comprise aliphatic, alicyclic, and aromatic radicals.

$R^3$ is a hydrocarbon group with 1-6 carbon atoms. In preferred embodiments of the present invention, $R^3$ is a methyl or ethyl group.

$R^4$ is an aliphatic, alicyclic, or aromatic group, which may have one or more $C_1$-$C_{20}$ linear or branched, saturated or unsaturated substituents. The subscript m can be 0 or 1.

One or more of carbon atoms and/or hydrogen atoms of $R^1$, $R^2$, $R^3$, and $R^4$, including any substituents thereof, may be replaced by a hetero-atom selected from the group consisting of N, O, S, Si, B, P, and halogen atoms.

In various embodiments of the present invention, two or more of said $R^1$, $R^2$, $R^3$, and $R^4$ may be linked to form one or more saturated or unsaturated ring structures.

Examples of suitable cyclic organosilicon compounds of the General Formula include, but not limited to:

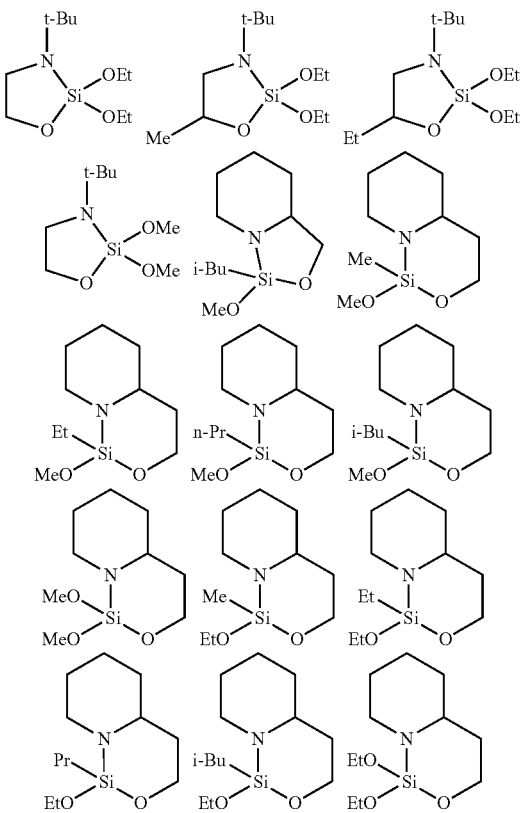

The present invention further relates to a process for olefin polymerization or copolymerization, wherein a cyclic organosilicon compound according to the invention is used as the external electron donor component in Zeigler-Natta catalyst systems. In a preferable embodiment, said process is homopolymerization or copolymerization of alpha olefins such as propylene. Processes for the polymerization of alpha olefins such as propylene and application mode and amount of external electron donor compounds therein are well known in the art.

To facilitate a better understanding of the present invention, the following examples of certain aspects of some embodiments are given. In no way should the following examples be read to limit, or define, the entire scope of the invention.

EXAMPLES

The catalyst components and properties of polymers in the examples were measured according to the following methods:
1. Organosilicon compounds were characterized by $^1$H-NMR and GC-MS.
2. Isotacticity of polymer was measured by heptane extraction method (heptane boiling extraction for 6 hours). Isotacticity is represented as heptane insoluable (HI), which is the ratio of the residual polymer weight after extraction to the initial polymer weight.
3. Melt flow rate (MFR) of polymer was measured according to ASTM D-1238, determined at 230° C., under the load of 2.16 kg.
4. Molecular weight distribution (MWD) of polymer was measured as Mw/Mn (weight average molecular weight/number average molecular weight) by gel permeation chromatography (GPC).

Unless otherwise indicated, all reactions were conducted under an inert atmosphere.

Organosilicon Compound Preparation

Example 1—Preparation of 3-tert-butyl-2,2-diethoxy-[1,3,2]oxazasilolidine

This example illustrates an organosilicon compound in accordance with the present invention and a method of preparing the same.

To a 500 mL flask was charged a solution of 2-(tert-butylamino)ethanol (100 mmol) in 100 ml of anhydrous THF. n-Butyllithium (2.5 M solution in hexanes, 200 mmol) was added dropwise to keep the solution below the boiling temperature. After addition of n-butyllithium, the reaction mixture was stirred for 30 minutes without external heating or cooling. Then a solution of tetraethyl orthosilicate Si(OEt)$_4$ (100 mmol) in anhydrous hexane (20 mL) was added over 10 minutes at room temperature. The resulting reaction mixture was heated to 60° C. and stirred at that temperature for 6 hours. Precipitates were slowly formed during the reaction process. GC analysis indicated that no starting materials were left. The solid byproduct was removed by centrifugation and the clear solution concentrated under reduced pressure. The crude product was further purified through vacuum distillation to afford the title product as a colorless oil.

GC purity: >99.0%; $^1$H-NMR (CDCl$_3$, 400 MHz) δ (ppm): 4.1 (m, 2H), 3.8 (m, 4H), 3.1 (m, 1H), 2.7 (t, 1H), 1.2 (m, 15H).

Example 2—Preparation of 3-tert-butyl-2,2-diethoxy-5-methyl-[1,3,2]oxazasilolidine This example illustrates another organosilicon compound in accordance with the present invention and a method of preparing the same.

The procedure and ingredients of Example 1 were followed except that 2-(tert-butylamino)ethanol (100 mmol) was replaced by 2-(tert-butylamino)-1-methyl-ethanol (100 mmol).

GC purity: >99.0%; $^1$H-NMR (CDCl$_3$, 400 MHz) δ (ppm): 4.2 (m, 1H), 3.8 (m, 4H), 3.1 (m, 1H), 2.7 (t, 1H), 1.2 (m, 18H).

Example 3—Preparation of 3-tert-butyl-2,2-diethoxy-5-ethyl-[1,3,2]oxazasilolidine This example illustrates another organosilicon compound in accordance with the present invention and a method of preparing the same.

The procedure and ingredients of Example 1 were followed except that 2-(tert-butylamino)ethanol (100 mmol) was replaced by 2-(tert-butylamino)-1-ethyl-ethanol (100 mmol).

GC purity: >99.0%; $^1$H-NMR (CDCl$_3$, 400 MHz) δ (ppm): 4.0 (m, 1H), 3.8 (m, 4H), 3.1 (m, 1H), 2.8 (t, 1H), 1.6 (m, 1H), 1.2 (m, 15H), 0.9 (t, 3H).

Example 4—Preparation of hexahydro-1,1-diethoxy-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol).

GC purity: >99.0%; $^1$H-NMR (CDCl3, 400 MHz) δ (ppm): 4.0 (m, 1H), 3.8 (m, 4H), 3.2 (m, 1H), 3.0 (m, 1H), 2.6 (t, 1H), 1.8 (m, 2H), 1.6 (m, 3H), 1.2 (m, 9H).

Example 5—Preparation of hexahydro-1,1-dimethoxy-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol) and tetraethyl orthosilicate (100 mmol) by tetramethyl orthosilicate (100 mmol).

GC purity: >99.0%; $^1$H-NMR (CDCl3, 400 MHz) δ (ppm): 4.0 (m, 2H), 3.5 (s, 6H), 3.2 (m, 1H), 3.0 (m, 1H), 2.6 (t, 1H), 1.8 (m, 2H), 1.6 (m, 3H), 1.2 (m, 3H).

Example 6—Preparation of hexahydro-1-ethoxy-1-(2-methylpropyl)-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol) and tetraethyl orthosilicate (100 mmol) by isobutyltriethoxysilane (100 mmol).

GC purity: >99.0%; $^1$H-NMR (CDCl3, 400 MHz) δ (ppm): 4.0 (m, 2H), 3.6 (m, 2H), 3.2 (t, 1H), 2.9 (m, 1H), 2.6 (m, 1H), 2.0-0.8 (m, 18H), 0.6 (d, 2H).

Example 7—Preparation of hexahydro-1-ethoxy-1-propyl-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol) and tetraethyl orthosilicate (100 mmol) by propyltriethoxysilane (100 mmol).

GC purity: >99.0%; 1H-NMR (CDCl3, 400 MHz) δ (ppm): 3.9 (m, 4H), 3.2 (t, 1H), 2.9 (m, 1H), 2.6 (m, 1H), 2.0-0.9 (m, 16H), 0.6 (m, 2H).

Example 8—Preparation of hexahydro-1-ethoxy-1-ethyl-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol) and tetraethyl orthosilicate (100 mmol) by ethyltriethoxysilane (100 mmol).

GC purity: >99.0%; $^1$H-NMR (CDCl3, 400 MHz) δ (ppm): 4.0 (m, 2H), 3.6 (m, 2H), 3.2 (t, 1H), 2.9 (m, 1H), 2.6 (m, 1H), 2.0-0.9 (m, 14H), 0.6 (m, 2H).

Example 9—Preparation of hexahydro-1-ethoxy-1-methyl-1H,3H-pyrido[1,2-c][1,3,2]oxazasiline This example illustrates another organosilicon compound in accordance with the present invention and a method of preparing the same.

The procedure and ingredients of Example 1 were followed except that 2-(tert-butylamino)ethanol (100 mmol) was replaced by 2-piperidineethanol (100 mmol) and tetraethyl orthosilicate (100 mmol) by methyltriethoxysilane (100 mmol).

GC purity: >99.0%; $^1$H-NMR (CDCl3, 400 MHz) δ (ppm): 3.9 (m, 4H), 3.2 (m, 1H), 2.9 (m, 1H), 2.6 (m, 1H), 2.0-0.9 (m, 11H), 0.2 (s, 3H).

Propylene Polymerization

Examples 10-22 illustrate alpha olefin polymers in accordance with certain teachings of the present invention, and a method of preparing the same.

Example 10

A bench scale 2-liter reactor was used. The reactor was first preheated to 100° C. with a nitrogen purge to remove residual moisture and oxygen. The reactor was thereafter cooled to 50° C.

Under nitrogen, 1 liter of dry heptane was introduced into the reactor. When the reactor temperature was about 50° C., 2.5 mmol of triethyl aluminum, 1.2 mmol of hexahydro-1,1-dimethoxy-1H,3H-pyrido[1,2-c][1,3,2]oxazasiline, and then 30 mg Toho 53-009 catalyst (available from Toho Catalyst Ltd.) were added to the reactor. The pressure of the reactor was raised to 28.5 psig by introducing nitrogen. Then, 200 ml of hydrogen was flashed into the reactor with propylene.

The reactor temperature was then raised to 70° C. Propylene was introduced to the reactor continually to keep the total reactor pressure at 90 psig. The polymerization was allowed to proceed for 1 hour. After completion of the polymerization reaction, the reactor was vented and cooled to 50° C.

Then the reactor was opened and 500 mL of methanol added. The resulting mixture was stirred for 5 minutes followed by filtration to obtain the propylene homopolymer. The obtained polymer was dried at 80° C. under vacuum for 6 hours.

The polymerization activity per hour was estimated with the weight of the obtained polymer, and hexane insoluble (HI), melt flow rate (MFR) and molecular weight distribution (Mw/Mn) were measured. The results are represented in Table 1 below.

Examples 11-14

A propylene polymer was prepared in the same manner as in Example 10 above, except that the amount of hydrogen was changed to 400 ml, 600 ml, 800 ml and 1000 ml, respectively. The results are represented in Table 1.

Examples 15-22

A propylene polymer was prepared in the same manner as in Example 10 above, except that the following external electron donors:
- 1.2 mmol of hexahydro-1,1-diethoxy-1H,3H-pyrido[1,2-c][1,3,2]oxazasiline,
- 1.2 mmol of hexahydro-1-ethoxy-1-(2-methylpropyl)-1H,3H-pyrido[1,2-c][1,3,2]oxazasiline,
- 1.2 mmol of hexahydro-1-ethoxy-1-propyl-1H,3H-pyrido[1,2-c][1,3,2]oxazasiline,
- 1.2 mmol of hexahydro-1-ethoxy-1-ethyl-1H,3H-pyrido[1,2-c][1,3,2]oxazasiline,
- 1.2 mmol of hexahydro-1-ethoxy-1-methyl-1H,3H-pyrido[1,2-c][1,3,2]oxazasiline,
- 1.2 mmol of 3-tert-butyl-2,2-diethoxy-[1,3,2]oxazasilolidine,
- 1.2 mmol of 3-tert-butyl-2,2-diethoxy-5-methyl-[1,3,2]oxazasilolidine,
- 1.2 mmol of 3-tert-butyl-2,2-diethoxy-5-ethyl-[1,3,2]oxazasilolidine, were used respectively, instead of 1.2 mmol of hexahydro-1,1-dimethoxy-1H,3H-pyrido[1,2-c][1,3,2]oxazasiline in example 10. The results are represented in Table 1.

Comparative Example 1

A propylene polymer was prepared in the same manner as in Example 10 above, except that 1.2 mmol of cyclohexylmethyldimethoxysilane (CHMDMS) was used as an external electron donor, instead of 1.2 mmol of hexahydro-1,1-dimethoxy-1H,3H-pyrido[1,2-c][1,3,2]oxazasiline in example 10. The results are represented in Table 1.

Comparative Examples 2-5

A propylene polymer was prepared in the same manner as in Example 10 above, except that 1.2 mmol of cyclohexylmethyldimethoxysilane (CHMDMS) was used as an external electron donor, instead of 1.2 mmol of hexahydro-1,1-dimethoxy-1H,3H-pyrido[1,2-c][1,3,2]oxazasiline in example 10, and the amount of hydrogen used was changed to 400 ml, 600 ml, 800 ml and 1000 ml, respectively. The results are represented in Table 1.

TABLE 1

| Example | External electron donor | Hydrogen (ml) | Activity (g/gCat-h) | MFR (g/10 min) | HI (%) | Mw/Mn |
|---|---|---|---|---|---|---|
| Ex. 10 | hexahydro-1,1-dimethoxy-1H,3H-pyrido[1,2-c][1,3,2]oxazasiline | 200 | 4074 | 41.4 | 97.7 | 4.2 |
| Ex. 11 | hexahydro-1,1-dimethoxy-1H,3H-pyrido[1,2-c][1,3,2]oxazasiline | 400 | 2986 | 70.5 | 97.0 | 4.2 |
| Ex. 12 | hexahydro-1,1-dimethoxy-1H,3H-pyrido[1,2-c][1,3,2]oxazasiline | 600 | 2715 | 130.0 | 95.3 | 4.2 |
| Ex. 13 | hexahydro-1,1-dimethoxy-1H,3H-pyrido[1,2-c][1,3,2]oxazasiline | 800 | 2642 | 216.8 | 95.0 | 4.2 |
| Ex. 14 | hexahydro-1,1-dimethoxy-1H,3H-pyrido[1,2-c][1,3,2]oxazasiline | 1000 | 2595 | 329.2 | 94.3 | 4.2 |
| Ex. 15 | hexahydro-1,1-diethoxy-1H,3H-pyrido[1,2-c][1,3,2]oxazasiline | 200 | 2264 | 33.9 | 97.4 | 4.3 |
| Ex. 16 | hexahydro-1-ethoxy-1-(2-methylpropyl)-1H,3H-pyrido[1,2-c][1,3,2]oxazasiline | 200 | 2850 | 22.8 | 96.7 | 5.0 |
| Ex. 17 | hexahydro-1-ethoxy-1-propyl-1H,3H-pyrido[1,2-c][1,3,2]oxazasiline | 200 | 2532 | 35.2 | 96.4 | 4.9 |
| Ex. 18 | hexahydro-1-ethoxy-1-ethyl-1H,3H-pyrido[1,2-c][1,3,2]oxazasiline | 200 | 4116 | 7.4 | 97.8 | 5.0 |
| Ex. 19 | hexahydro-1-ethoxy-1-methyl-1H,3H-pyrido[1,2-c][1,3,2]oxazasiline | 200 | 3108 | 53.8 | 96.0 | 4.3 |
| Ex. 20 | 3-tert-butyl-2,2-diethoxy-[1,3,2]oxazasilolidine | 200 | 3450 | 22.5 | 95.0 | 4.4 |
| Ex. 21 | 3-tert-butyl-2,2-diethoxy-5-methyl-[1,3,2]oxazasilolidine | 200 | 4102 | 18.2 | 95.4 | 4.4 |
| Ex. 22 | 3-tert-butyl-2,2-diethoxy-5-ethyl-[1,3,2]oxazasilolidine | 200 | 3390 | 16.5 | 95.8 | 4.4 |
| Comp. 1 | Cyclohexylmethyldimethoxysilane | 200 | 3086 | 12.5 | 98.1 | 4.2 |
| Comp. 2 | Cyclohexylmethyldimethoxysilane | 400 | 2926 | 25.7 | 97.6 | 4.2 |
| Comp. 3 | Cyclohexylmethyldimethoxysilane | 600 | 2908 | 47.3 | 97.1 | 4.2 |
| Comp. 4 | cyclohexylmethyldimethoxysilane | 800 | 2847 | 70.1 | 96.9 | 4.2 |
| Comp. 5 | cyclohexylmethyldimethoxysilane | 1000 | 2754 | 101.4 | 96.6 | 4.2 |

As is evident from the above examples and comparative examples, catalyst systems comprising the cyclic organosilicon compounds of the present invention as the external electron donor component exhibit dramatically-improved hydrogen response, and therefore a higher melt-flowability and higher isotacticity at high yield, as compared to catalyst systems utilizing CHMDMS as the electron donor. Although CHMDMS is well known in the art to demonstrate the highest hydrogen response of commonly used commercial electron donors, the catalysts systems of the present invention achieves much higher MFR at the same lower hydrogen loading, or the same MFR as CHMDMS at a much lower hydrogen loading.

Therefore, the present invention is well adapted to attaint the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Whenever a numerical range with a lower limit and an upper limit is disclosed, and number falling within the range is specifically disclosed. Moreover, the indefinite articles "a" or "an", as use in the claims, are defined herein to mean one or more than one of the element that it introduces.

What is claimed is:

1. A method for producing olefin homo-polymer or copolymer having high melt flowability at reduced hydrogen loading, comprising:
    a. providing an external electron donor comprising an oxazasiline compound; and
    b. reacting monomer in the presence of the external electron donor to produce the olefin homo-polymer or copolymer;
    wherein the melt flow rate of the olefin homo-polymer or copolymer is greater than 20 g/10 minutes.

2. The method of claim 1, wherein the oxazasiline compound is hexahydro-1-ethoxy-1-(2-methylpropyl)-1H-3H-pyrido[1,2-c][1,3,2]oxazasiline.

3. The method of claim 1, wherein the oxazasiline compound is hexahydro-1-ethoxy-1-propyl-1H,3H-pyrido[1,2-c][1,3,2]oxazasiline.

4. The method of claim 1, wherein the oxazasiline compound is hexahydro-1-ethoxy-1-methyl-1H,3H-pyrido[1,2-c][1,3,2]oxazasiline.

5. The method of claim 1, wherein the oxazasiline compound is hexahydro-1,1-dimethoxy-1H,3H-pyrido[1,2-c][1,3,2]oxazasiline.

* * * * *